United States Patent
Wu

(10) Patent No.: US 6,731,684 B1
(45) Date of Patent: May 4, 2004

(54) METHOD AND APPARATUS FOR DETECTING SCENE CHANGES AND ADJUSTING PICTURE CODING TYPE IN A HIGH DEFINITION TELEVISION ENCODER

(75) Inventor: Siu-Wai Wu, San Diego, CA (US)

(73) Assignee: General Instrument Corporation, Horsham, PA (US)

(*) Notice: Subject to any disclaimer, the term of this patent is extended or adjusted under 35 U.S.C. 154(b) by 0 days.

(21) Appl. No.: 09/806,390

(22) PCT Filed: Aug. 27, 1999

(86) PCT No.: PCT/US99/19804

§ 371 (c)(1),
(2), (4) Date: Mar. 29, 2001

(87) PCT Pub. No.: WO00/19726

PCT Pub. Date: Apr. 6, 2000

Related U.S. Application Data

(60) Provisional application No. 60/102,234, filed on Sep. 29, 1998.

(51) Int. Cl.[7] .................................................. H04N 7/12
(52) U.S. Cl. .................................. 375/240.12; 348/699
(58) Field of Search ................................ 348/699, 700, 348/701, 419.1; 375/240.12, 240.26; 382/232, 233, 242; H04N 7/12

(56) References Cited

U.S. PATENT DOCUMENTS

| | | | |
|---|---|---|---|
| 5,343,248 A | 8/1994 | Fujinami | |
| 5,500,689 A | 3/1996 | Lam | |
| 5,508,750 A | 4/1996 | Hewlett | |
| 5,686,963 A | * 11/1997 | Uz et al. | ............... 375/240.06 |
| 5,734,419 A | 3/1998 | Botsford, III et al. | |
| 5,751,378 A | 5/1998 | Chen et al. | |
| 5,771,316 A | 6/1998 | Uz | |
| 5,832,121 A | 11/1998 | Ando | |
| 5,899,575 A | 5/1999 | Okayama | |

(List continued on next page.)

FOREIGN PATENT DOCUMENTS

| | | |
|---|---|---|
| EP | 0554086 | 8/1993 |
| WO | 0708564 | 4/1996 |
| WO | 9739577 | 10/1997 |

OTHER PUBLICATIONS

"Scene change detection in GA encoder", published in digitalHDTV Grand Alliance System Record of Test Results, Jun. 28, 1995.

(List continued on next page.)

*Primary Examiner*—Nhon Diep
(74) *Attorney, Agent, or Firm*—Barry R. Lipsitz; Douglas M. McAllister

(57) ABSTRACT

A method and apparatus are provided for detecting scene changes between successive fields in a digital television signal. I-frames, which start new GOPs, are aligned with scene changes. In a preprocessing stage (205, 210), the change in the sum of pixel differences between consecutive odd fields, or consecutive even fields, is calculated for every consecutive input field. A scene change is detected when a large positive value in the change of sum is followed by a large negative value therein. A decision of which picture type to use is not made until a final encoding stage (225, 235). I-frames can be inhibited when an encoder buffer level is too high. A counter resets the scene change indication to avoid a perpetual scene change state for transitions from still to motion. In film mode, the MPEG-recommended frame-based encoding is deactivated when a scene change occurred on a field boundary (e.g., when there is no redundant field in the picture).

21 Claims, 7 Drawing Sheets

U.S. PATENT DOCUMENTS

| | | | |
|---|---|---|---|
| 5,909,252 A | | 6/1999 | Ueda et al. |
| 5,923,376 A | | 7/1999 | Pullen et al. |
| 6,044,115 A | | 3/2000 | Horiike et al. |
| 6,084,641 A | | 7/2000 | Wu |
| 6,091,776 A | * | 7/2000 | Linzer .................. 375/240.12 |
| 6,408,024 B1 | * | 6/2002 | Nagao et al. .......... 375/240.01 |
| 6,434,196 B1 | * | 8/2002 | Sethuraman et al. ... 375/240.12 |
| 6,587,506 B1 | * | 7/2003 | Noridomi et al. ...... 375/240.12 |

OTHER PUBLICATIONS

Advanced Television Systems Committee Standard A/54, "Guide to the Use of the ATSC Digital Television Standard", Oct. 4, 1995.

ISO/IEC 13818–2, "Generic Coding of Moving Picutures and Associated Audio: Video", (MPEG2 Standard) 1995 E.

* cited by examiner

METHOD AND APPARATUS FOR DETECTING SCENE CHANGES AND ADJUSTING PICTURE CODING TYPE IN A HIGH DEFINITION TELEVISION ENCODER

This application claims the benefit of U.S. Provisional Application No. 60/102,234, filed Sep. 29, 1998.

BACKGROUND OF THE INVENTION

The present invention relates to video compression, and more particularly to a method and apparatus for detecting scene changes and adjusting the picture coding type to optimize the coding efficiency of a video encoder. The invention is particularly useful for picture coding type decision and scene change detection in a digital HDTV encoder.

Aligning intra-coded (I) frames with scene changes can significantly improve the coding efficiency of an MPEG (Moving Picture Expert's Group) video encoder. In the past, such scene change detection has been provided, for example, by detecting variations in luminance values.

In some existing scene change detection proposals, the coding of an I-frame is avoided until the scene change is over and a new GOP (group of pictures) is started. However, scene change detection is performed on a frame-by-frame basis. Therefore, this approach can yield incorrect results where there are bad edits, special effects or camera flashes, where the scene change might occur on the odd/even field boundary of the same frame.

Accordingly, it would be advantageous to provide a system for detecting scene changes, including flashes, or bad fields that result from improper editing, and adjusting the picture coding type without the aforementioned problems encountered by the prior art. It would be further advantageous to better optimize the coding efficiency of a video encoder during scene changes. It would also be desirable to provide an efficient system for scheduling a new GOP based on the detection of a scene change. Moreover, the system should detect scene changes between successive fields.

The system should make use of an encoding processing pipeline architecture that provides the required lookahead delay to avoid issuing a scheduled I-frame at the proximity of a scene change, while minimizing the amount of frame buffer memory required to provide the lookahead capability.

The scheme should be compatible with different HDTV modes/pixel resolutions, including 1920×1080 I (interlaced scan), 1440×1080 I, and 1280×720 p (progressive scan), as well as standard definition (SDTV) video.

The system should be compatible with any digital video coding scheme, including MPEG-2.

The system should inhibit the encoding of I-frames when an encoder buffer level is too high.

The system should provide a watchdog counter that resets the scene change indication to avoid a perpetual scene change state for transitions from still to motion.

For an MPEG film mode frame picture that is determined to be a scene change frame, to improve coding accuracy and efficiency, the system should deactivate the MPEG-recommended frame-based Discrete Cosine Transform (DCT) and prediction encoding when a scene change may have occurred on a field boundary.

The present invention provides a scene change and adjustment scheme having the aforementioned and other advantages.

SUMMARY OF THE INVENTION

The present invention relates to an efficient video compression scheme that detects scene changes between successive fields, including flashes, or bad fields that result from improper editing, and adjusts the picture coding type and GOP boundaries in response thereto. The term "scene change" is thus used generally herein to encompass events including a normal scene change (at a frame boundary), a scene change at a field boundary of the same frame, a bad edit or flash, or any other sudden change in a sequence of video images.

In accordance with the present invention, scene change detection is performed at a preprocessing stage of a video encoder. The final decision to encode a frame as an I- or P-frame is not made until a final encoding stage. That is, the encoder's processing pipeline is used as a lookahead buffer to minimize the amount of required frame buffer memory.

In particular, the preprocessing stage of the video encoder calculates a change in the sum of pixel differences between consecutive odd fields, or consecutive even fields, for every consecutive input field. A scene change is then detected by looking for a large positive value (exceeding a positive threshold) in the change in sum, followed by a large negative value (less than a negative threshold) I-frames are inhibited at the encoding stage of the processing pipeline as soon as a scene change is detected. A new GOP is started when a scene change frame arrives at the encoding stage of the pipeline, and there is no other scene change frame in the pipeline.

A scene change counter is used to keep track of the number of uncoded scene change frames currently in the processing pipeline. I-frames are prohibited for as long as the scene change counter has a value greater than zero, except for the last scene change frame in a burst (succession) of scene change frames.

Additionally, a, scene change countdown counter, or "watchdog" counter, is used to account for a transition from a still frame to a motion frame to ensure that a scene change is not set permanently.

Moreover, for an MPEG film mode picture that is determined to be a scene change frame, the MPEG-recommended frame-based Discrete Cosine Transform (DCT) and prediction encoding is deactivated when a scene change is indicated at a field boundary (e.g., when there is no redundant field in the picture). Upon such deactivation, either frame- or field-based DCT and prediction can be use on a macroblock-by-macroblock basis in the picture. This allows field prediction to be used to handle bad edits where a scene change may occur at the odd/even field boundary of the same frame.

The invention is suitable for use with both high definition television (HDTV) encoders and standard definition television (SDTV) encoders.

DETAILED DESCRIPTION OF THE INVENTION

The present invention relates to an efficient video compression scheme that detects scene changes between successive fields, and adjusts the picture coding type and GOP boundaries in response thereto.

The following terminology is used:

| Term: | Description: |
|---|---|
| CountDown | Number of remaining frames until ScDet is set to false (far still-to-moving transition sequences); |
| d1 | Delta in consecutive scene change scores for first field; |
| d2 | Delta in consecutive scene change scores for second field; |
| FrameCount | Number of frames encoded so far in the GOP; |
| GopLen | Nominal GOP length; |
| maxCount | Maximum allowed number of consecutive repeat fields; |
| MaxGopLen | Maximum allowed GOP length; |
| picture_type | Picture type, possibly modified based on scene change detection; |
| preType | Pre-picture type - nominal assigned picture type; |
| rfc | Repeat field count - number of consecutive repeat fields; |
| sc1 | Scene score 1 - scene change metric for first field; |
| sc2 | Scene score 2 - scene change metric for second field; |
| ScCount | Scene change count - number of scene change frames currently in the processing pipeline; |
| ScDet | Scene change frame detected; |
| scene_change | Scene change frame declared; |
| scLast | Last scene_score; |
| ScPending | Scene change pending; |
| start_new_gop | Start a new GOP with current frame; |
| Th0 | Zero threshold for scene scores sc1, sc2; |
| ThBuf | buffer level threshold that is used to determine whether a new GOP can be started; |
| ThNeg | Negative threshold for scene scores sc1, sc2; and |
| ThPos | Positive threshold for scene scores sc1, sc2. |

Figure 1:
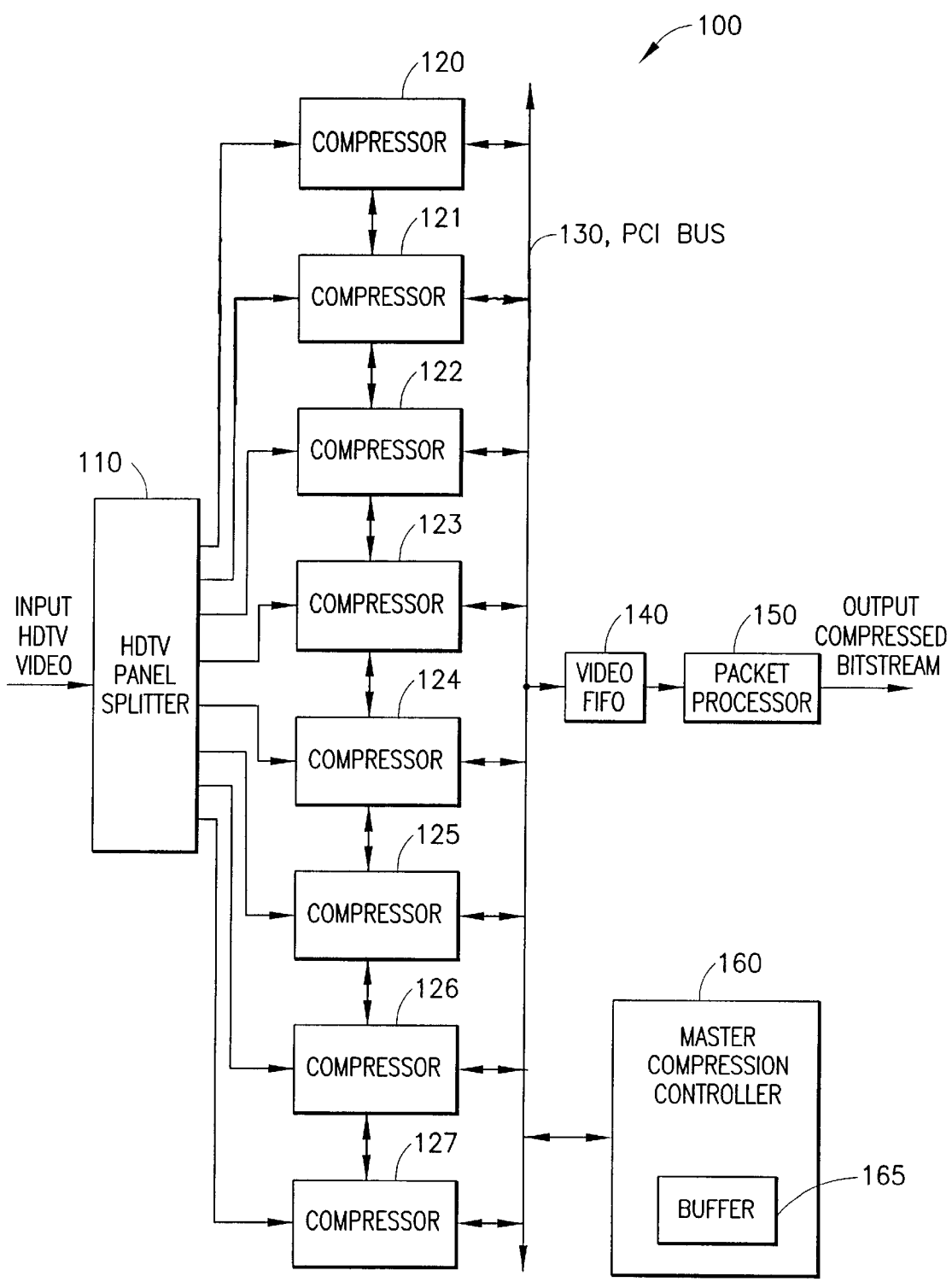
FIG. 1 is a block diagram illustrating an HDTV encoder in accordance with the present invention.

FIG. 1 is a block diagram illustrating an HDTV encoder in accordance: with the present invention.

The encoder 100 includes a HDTV panel splitter 110 that receives an input HDTV video stream. The splitter 110 splits the data among eight separate video compressors 120–127. The compressors 120 communicate with a Peripheral Component Interconnect (PCI) bus 130. A video buffer 140 (such as a first-in, first-out, or FIFO buffer) receives the compressed video data from the bus and provides it to a packet processor 150 to provide an output compressed bitstream, A Master Compression Controller (MCC) 160, which includes a circular buffer 165, controls the flow of data and synchronizes the video compressors 120–127. The function of the buffer 165 is discussed further in connection with FIG. 6.

Note that the invention is illustrated in a multi-compressor HDTV embodiment, but can be used with SDTV data as well. Moreover, the use of eight compressors 120–127 is an example only, as any number of compressors may be used.

The input HDTV picture is split into eight panels. Each panel is processed by a video compression engine. The compression engines 120–127 dump the compressed video data into the video buffer 140. The Packet Processor 150 pulls the compressed data from the buffer 140 at a rate determined by the configured output bandwidth, and packetizes the data into MPEG transport packets, for example.

Figure 2:
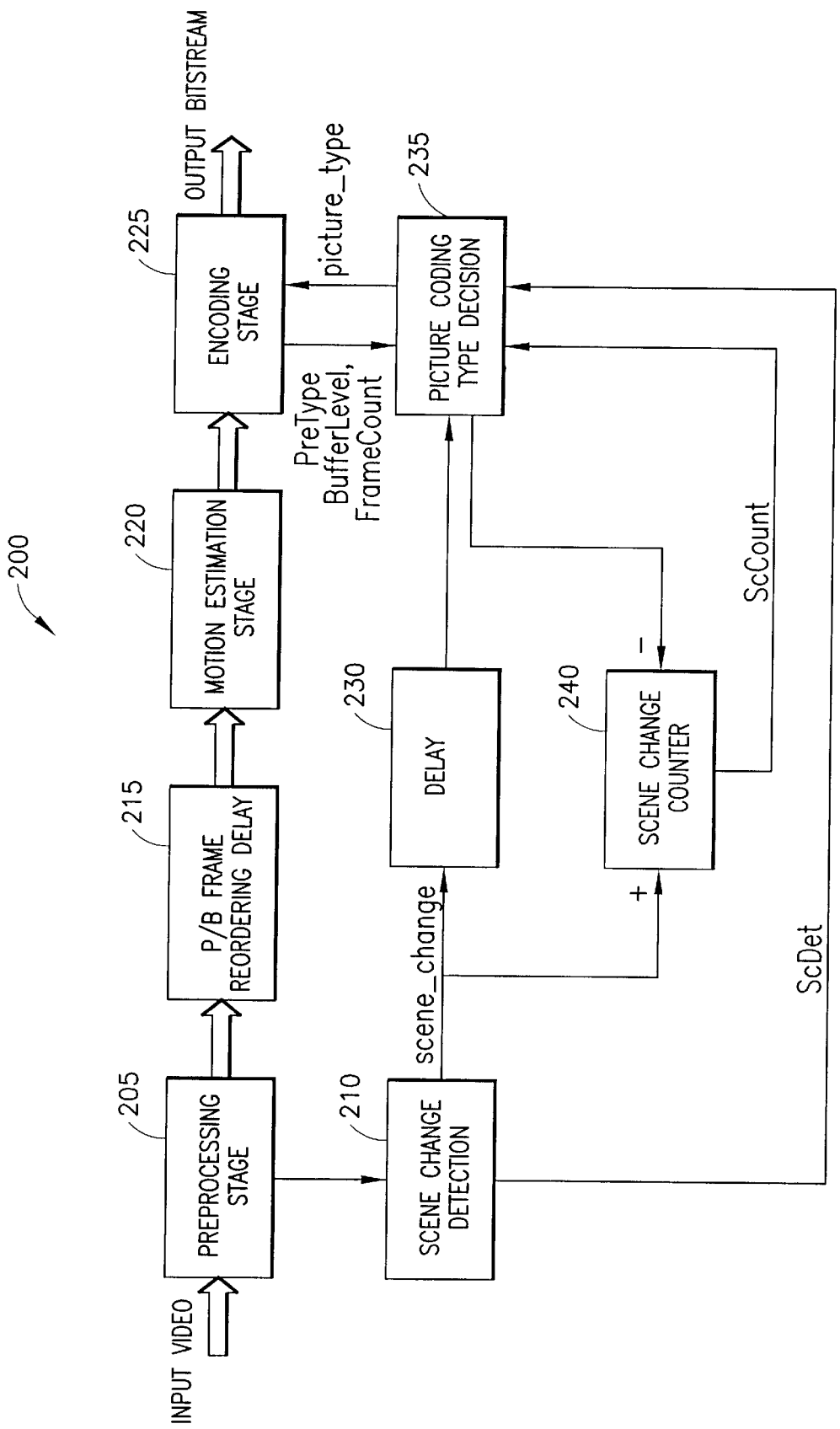
FIG. 2 illustrates a video encoder processing pipeline in accordance with the present invention.

FIG. 2 illustrates a video encoder processing pipeline in accordance with the present invention. The video compressors 120–127 process the video frames using a pipeline architecture 200. The first stage of the pipeline 200 includes a preprocessing stage 205, which performs video filtering, downsampling (optional), and calculates the statistics for use in a detelecine and scene change detection function 210.

Subsequent stages of the pipeline 200 include a P/B frame reordering delay function 215 that delays and reorders the video frames. This is done since P-frames are sometimes encoded out of display order for use in predicting the B-frames. A motion estimation stage 220 carries out motion estimation. The final stage includes an encoding stage 225 for performing the actual encoding of the video frames to provide an output bit stream.

To facilitate the subsequent stages of reordering and motion estimation, the preprocessing stage 205 determines whether or not a preprocessed frame is a B-frame. If a frame is not classified as a B frame, the encoder (encoding stage 225) determines whether it is an I- or P-frame at the final stage of the pipeline, just before the picture is actually encoded. A new GOP is started by an I-frame.

The scene change detection function 210 detects scene changes between consecutive frames at the preprocessing stage of the pipeline. The main objective of scene change processing is to change the location of the scheduled start of a new GOP to align with the start of the new scene if a scene change is detected at the proximity of the originally scheduled I-frame. Once a scene change is detected at the scene change detection function 210, a control signal (ScDet flag) is sent to the encoding stage 225 to prevent it from generating I-frames for frames that are currently in the encoder's processing pipeline waiting to be encoded. When the corresponding scene change frame subsequently arrives at the encoding stage 225, it is encoded as an I-frame, assuming there are no other scene change frames in the pipeline, in which case the last scene change frame in the pipeline is encoded as an I-frame.

In particular, the scene change flag is provided to a delay 230 to account for the delays in processing the corresponding frame in the reordering delay function 215 and motion estimation stage 220, and to a picture coding type decision function 235. The function 235 sends a corresponding picture_type control signal to the encoding stage 225 to set the picture type of the current frame to be encoded.

In the event that multiple scene changes are detected in a row in successive frames (e.g. camera flashes, special effects, bad frame/field created by improper edit), the start new GOP decision function 235 waits to send the start new GOP control signal to the encoding stage 225. Thus, the encoding stage 225 waits to encode an I-frame and start a new GOP until the last scene change is over.

This is different from prior art schemes that perform both scene change detection and picture coding type decision at the preprocessing stage, thereby requiring a large amount of lookahead frame buffer, or perform both scene change detection and picture coding type decision at the encoding stage, which does not provide any lookahead capability. Advantageously, the pipeline architecture 200 provides the required lookahead delay to avoid issuing a scheduled I-frame at the proximity of a scene change, while minimizing the amount of frame buffer memory required to provide the lookahead capability.

A scene change counter 240 maintains a count, ScCount, of the number of scene change frames in the pipeline 200. The count is incremented for each new scene change frame that is designated at the scene change detection function 210, and decremented for every scene change frame that reaches the picture coding type decision function 235.

The preliminary picture type information (preType) is determined by the preprocessing stage 205 and tagged to the: video frame throughout the pipeline 200. This information is retrieved for use in determining the final picture type (picture_type) to be used when the frame arrives at the encoding stage 225. Essentially, the pre-assigned picture type of a frame may be modified in accordance with the present invention when a scene change is detected, as discussed further in "Scene Change Examples", below.

For every preprocessed frame, the scene change detection function 210 calculates the absolute differences between pixels of the corresponding panel of the current input frame and previous input frame. These absolute differences are summed over the first and second fields and scaled to fit into a 16-bit unsigned integer to form a pair of scene change metrics, namely sc1 (for the first field) and sc2 (for the second field). It is possible to generate the scene change metric from a subset of input pixels to simplify implementation, e.g., by spatially down-sampling the frame-prior to calculating the scene change metrics. The scene change detection functions 210 may be implemented by having the MCC 160 read the scene change measures from the video compressors 120–127 to detect a scene change. Based on the results of scene change detection, the encoder's output video FIFO level, and the number of frames coded so far in the GOP, the picture coding type decision function 235 (which may be implemented by the MCC 160) makes a final decision for the picture coding type of the frame at the encoding stage 225 of the processing pipeline.

Figure 3:
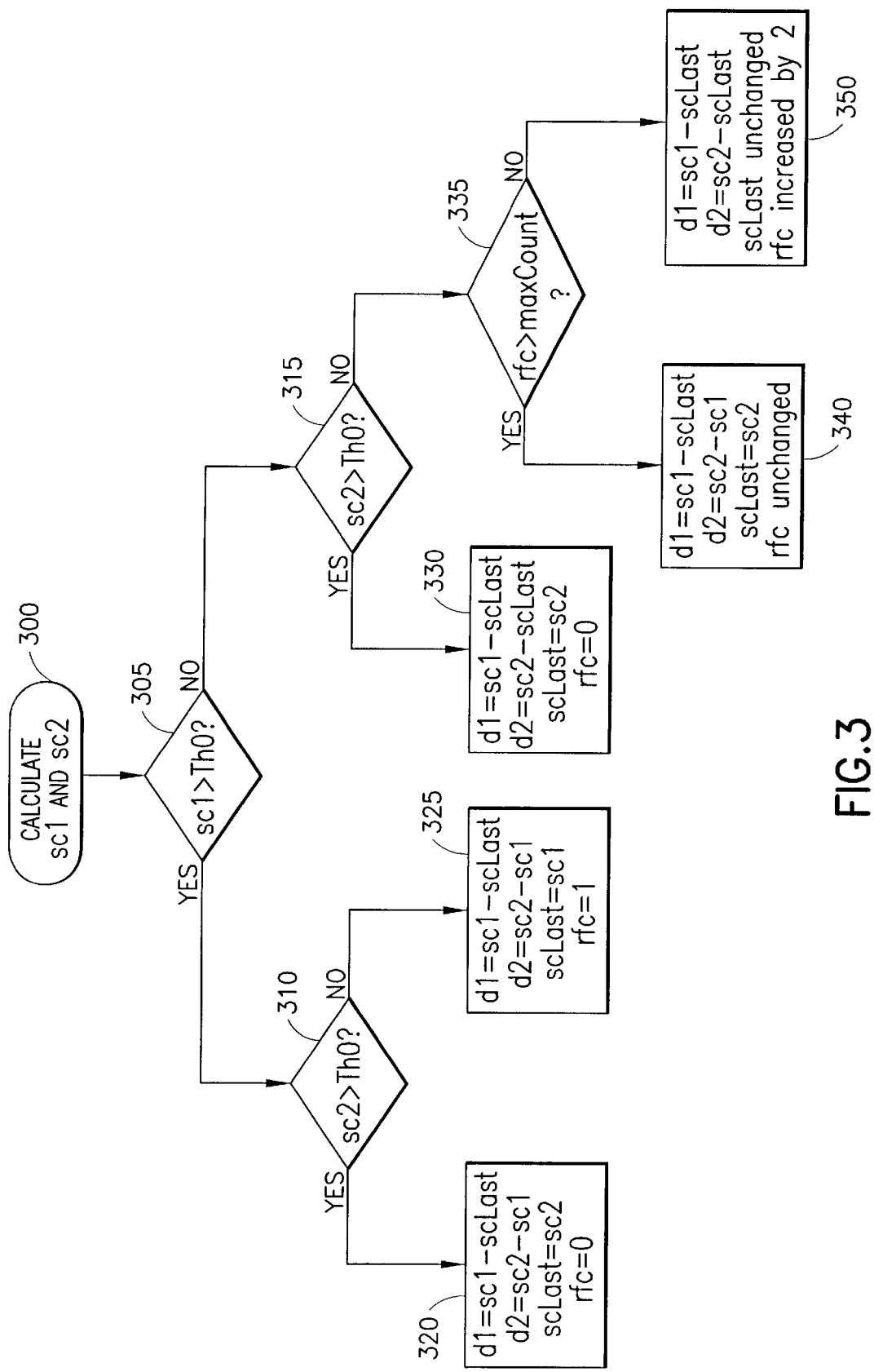
FIG. 3 illustrates a flowchart for determining scene change score deltas, the most recently used scene change score, and the number of consecutive repeat fields in accordance with the present invention.

FIG. 3 illustrates a flowchart for determining scene change score deltas, the most recently used scene change score, and the number of consecutive repeat fields in accordance with the present invention.

To detect a scene change, the scene change detection function 210, implemented by the MCC 160, first calculates the scene change scores sc1 and sc2 for the entire odd field and even field of each frame by summing the MAD values over all panels in the frame (block 300).

The scene change detection function 210 detects a scene change by looking for an abrupt increase in the scene scores followed by an abrupt decrease. At block 305, Sc1>a threshold value Th0 is tested, and at blocks 310 and 315, sc2>Th0 is tested. d1, d2, scLast and rfc are set as indicated at block 320 when both sc1 and sc2 exceed Th0, or at block 325 when sc1 exceeds Th0 but sc2 does not, or at block 330 when sc2 exceeds Th0 but sc1 does not. At block 335, a determination is made as to whether the number of consecutive repeat fields (rfc) exceeds the maximum value (maxCount). d1, d2, scLast and rfc are set accordingly at blocks 340 and 350 if block 335 is true or false, respectively.

In the figures and text herein, "yes", "true" and "1" are synonymous, while "no", "false" and "0" are synonymous.

Generally, there are three thresholds defined {ThPos, ThNeg, Th0}, whose values depend on the video format as follows:

|  | 1920 × 1080 I | 1440 × 1080 I | 1280 × 720 P |
|---|---|---|---|
| ThPos | 24,480 | 17,952 | 10,240 |
| ThNeg | −16,320 | −11,968 | −5,120 |
| Th0 | 6,120 | 4,488 | 1,920 |

The video format refers to the horizontal×vertical pixel resolution, and whether the video is interlaced-scan (I) or progressive-scan (P). This notation should not be confused with the I- and P-frame types. The meaning should be clear from the context. The invention accommodates both interlaced-scan and progressive-scan frames. Progressive scan images are processed in first and second fields. These are suggested thresholds only, and their values may adjusted, e.g., by experimentation with different video sequences.

The scene change detection function 210 calculates the differences, d1 and d2, between consecutive scene change scores for both the first and second input fields, respectively. The most recently used scene change score is maintained by the variable scLast. Repeated fields up to a maximum count (maxCount) are skipped when calculating the differences d1 and d2.

The variable rfc is maintained to keep track of the number of consecutive repeat fields. The maximum number of consecutive repeat fields, maxCount, can be set, e.g., to fourteen fields for 1080 I mode, and twenty-four fields for 720 P mode. However, other values can be used. Whenever rfc exceeds maxCount (box 335), it is assumed that there is a true still picture so that d1, d2, and rfc are updated normally (box 340).

d1 is calculated as the difference between sc1 and sc2. d2 is calculated as the difference between sc2 and either sc1 or scLast, depending on whether the scene scores are above Th0 and rfc is smaller than the maximum count.

Small scene change scores for up to the maximum count (maxCount) are excluded (blocks 325, 330 and 350) to avoid false detection when there are repeated fields, e.g., in cartoons, slow motion edits, and bad films that fail the detelecine processing. Detelecine processing refers to removing the redundant fields in a 3:2 pulldown video sequence. If the telecine process (transfer from film to video) is noisy, the encoder's detelecine process may not be able to detect the redundant fields.

Another scenario is when the encoder deliberately maintains the redundant field as commanded by the user (e.g., if the user deliberately disables the detelecine process on the encoder), or at edit points where a redundant field may not be dropped (e.g. when there are redundant fields in two consecutive frames). There are also special films which do not follow the regular 3:2 pulldown pattern, e.g., 3:3:2:2 instead of 3:2:3:2.

In the case of a 3-field film frame, we only check for a scene change between the first and second fields, because the third field is dropped at the encoder.

Figure 4:
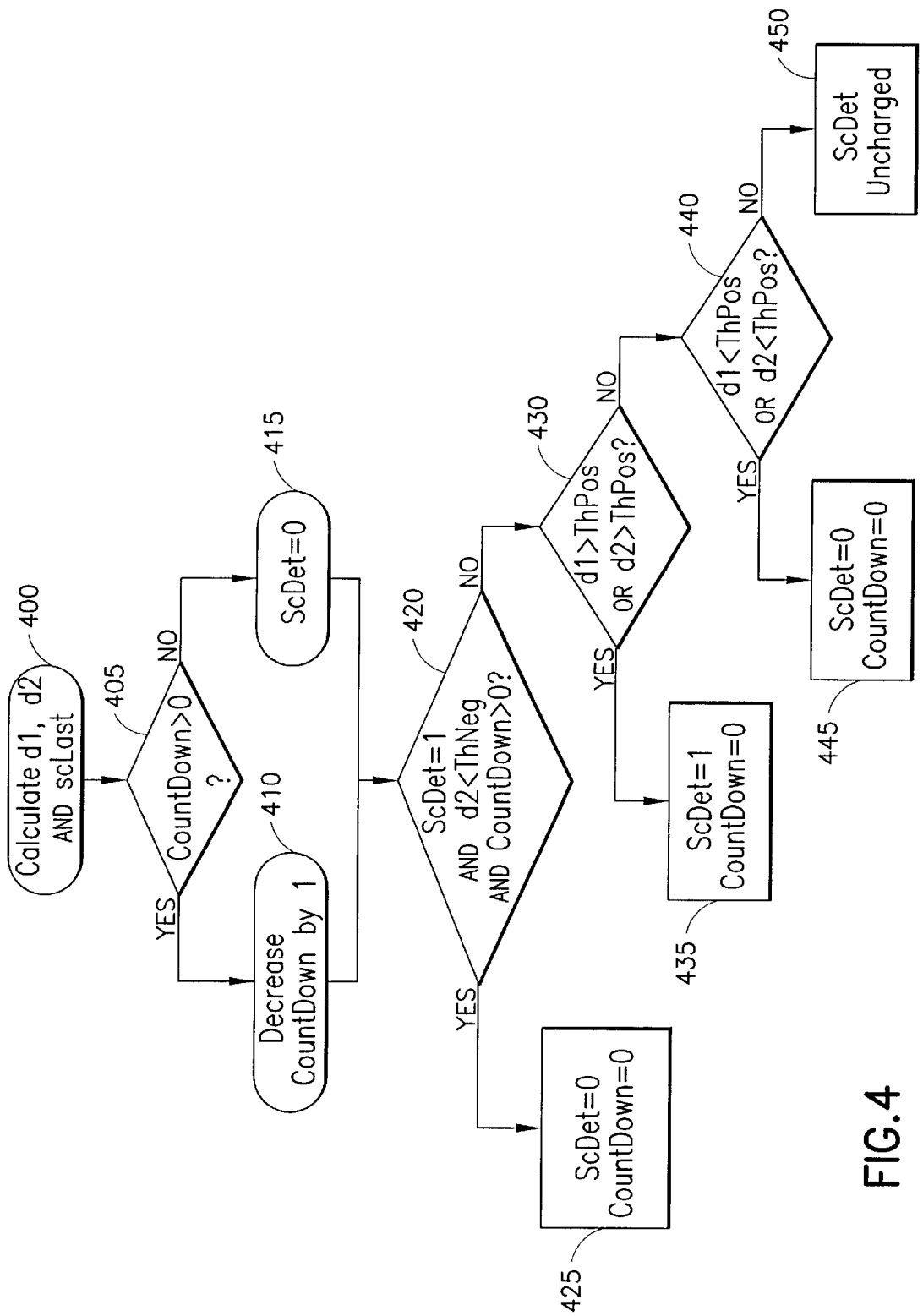
FIG. 4 illustrates a flowchart for determining a scene change detected frame, and activating a scene change countdown timer, in accordance with the present invention.

FIG. 4 illustrates a flowchart for determining a scene change detected frame, and activating a scene change countdown timer, in accordance with the present invention.

At block 400, d1, d2 and scLast are calculated as explained in connection with box 320, 325, 330, 340 or 350 in FIG. 3.

The MCC maintains the flag ScDet that indicates a scene change has happened. ScDet is set to true (i.e., one) (block 435) whenever the changes in the scene scores (d1 or d2)

exceed a positive threshold (block 430). ScDet is reset to zero (blocks 425 and 445) whenever the changes in d1 and d2 are negative, and are less than a negative threshold (block 440). ScDet is unchanged (block 450) when d1 and d2 are near Th0, that is, neither d1 nor d2 exceeds ThPos or is less than ThNeg.

A watchdog counter, CountDown, is maintained to keep track of the number of frames elapsed since the last time the scene scores exceed the positive threshold. The counter is decremented by one for every frame thereafter (block 410) until it reaches zero (block 405). ScDet is reset to zero when the counter reaches zero (block 415). This mechanism forces ScDet to reset in case a large negative change in scene score does not follow a large positive surge, which may happen when objects begin to move in a still image (i.e., in a still-to-motion sequence).

Figure 5:
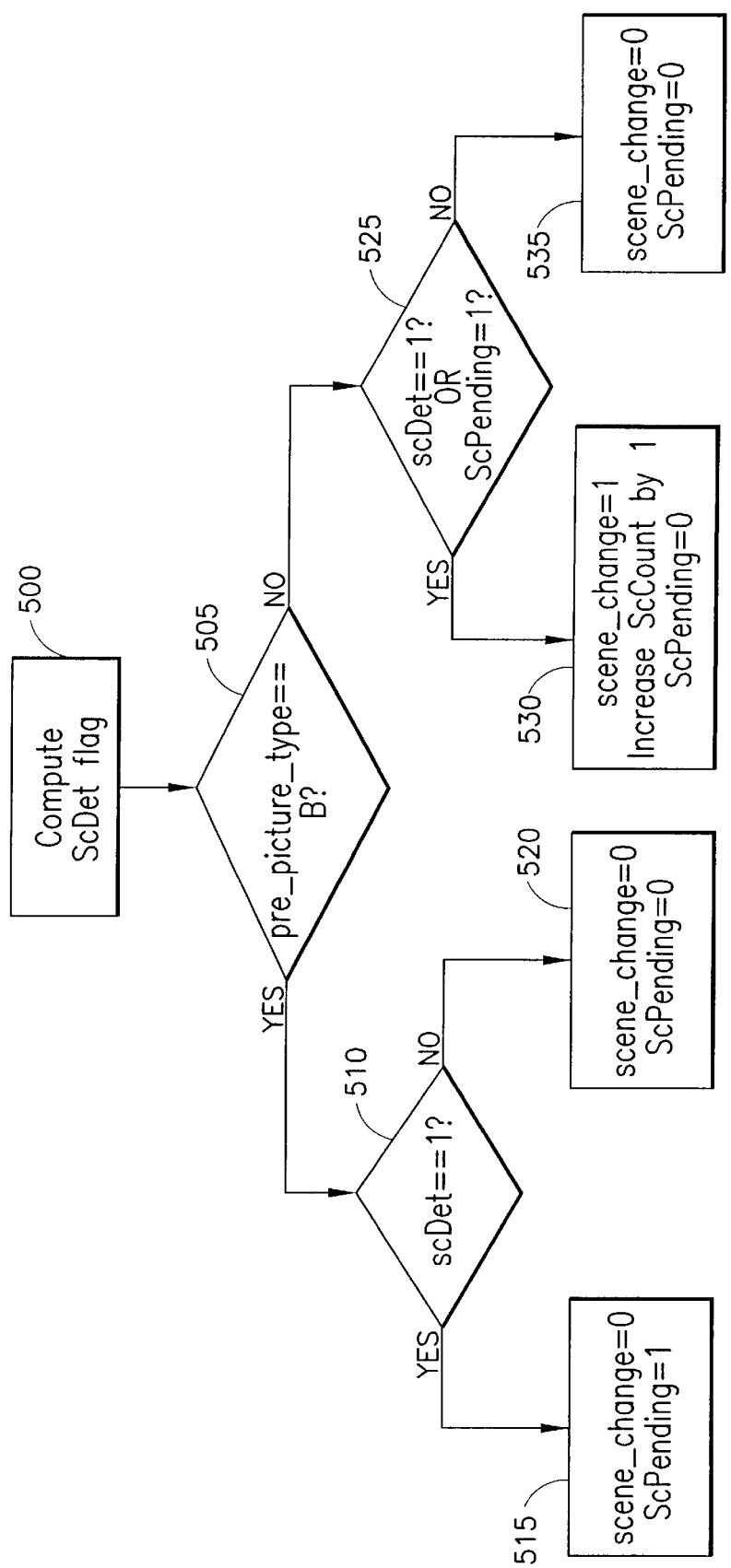
FIG. 5 illustrates a flowchart for setting a scene change flag in accordance with the present invention.

FIG. 5 illustrates a flowchart for setting a scene change flag in accordance with the present invention.

ScDet is determined at block 500 as discussed in connection with blocks 415, 425, 435, 445 and 450 in FIG. 4.

The MCC uses the preliminary picture type (B-frame or not B-frame) (block 505) determined at the preprocessing stage 205 of the encoding pipeline 200 to indicate that a new GOP may start at the current frame. If a scene change is detected on a pre-processed B-frame (block 510), Scpending is set to true, but a scene change for the B-frame is not-set (block 515). If a scene change is not detected on a preprocessed B-frame (block 510), Scpending and the scene_change flag for the B-frame are set to false (block 520).

For the next P-frame that follows the pre-processed B-frame, where ScDet or ScPending is true (block 525), the scene change flag is set to true (block 530). For the next P-frame that follows the pre-processed B-frame, where neither ScDet nor Scpending is true (block 525), the scene change flag is set to false (block 535).

Thus, the MCC keeps track of the number of scene changes currently in the processing pipeline by a ScCount. The value of ScCount increases by one (block 530) if the scene-change flag is set, and decreases by one (block 610 in FIG. 6) if the current picture at the encoding stage is a scene change frame. The scene change flag and the preType of the preprocessed frame are stored in the circular buffer 165 of the MCC 160, and are retrieved later to determine the final picture type when the frame is encoded. The circular buffer 165 is indexed by a temporal reference tag which is sequence number that indicates the input order of each frame. Note that the input to the circular buffer 165 is in display order, while the output is in coding order (after B/P frame reordering).

Figure 6A:
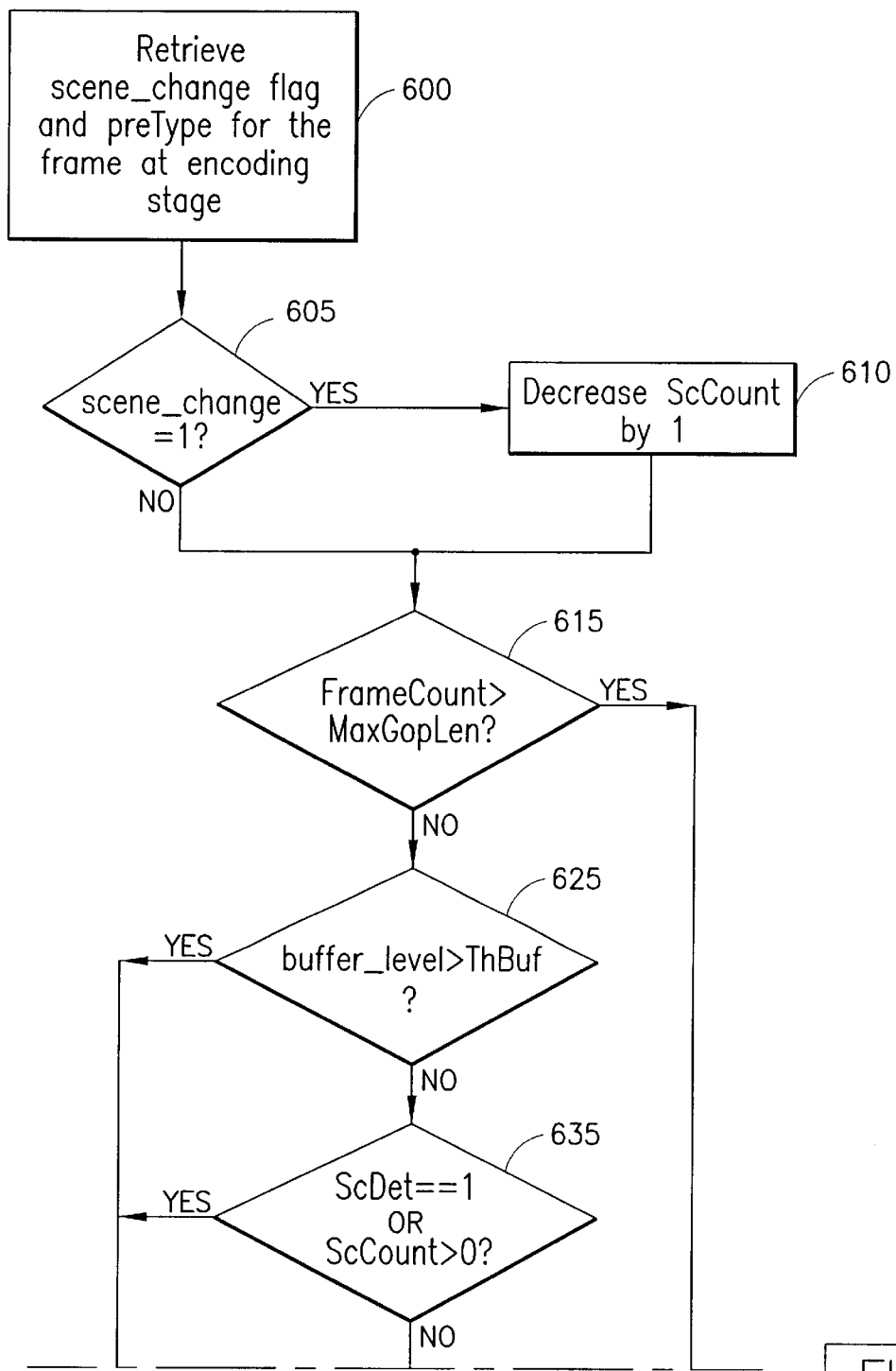
FIG. 6 illustrates a flowchart for determining the final picture coding type for a frame in accordance with the present invention.
Figure 6B:
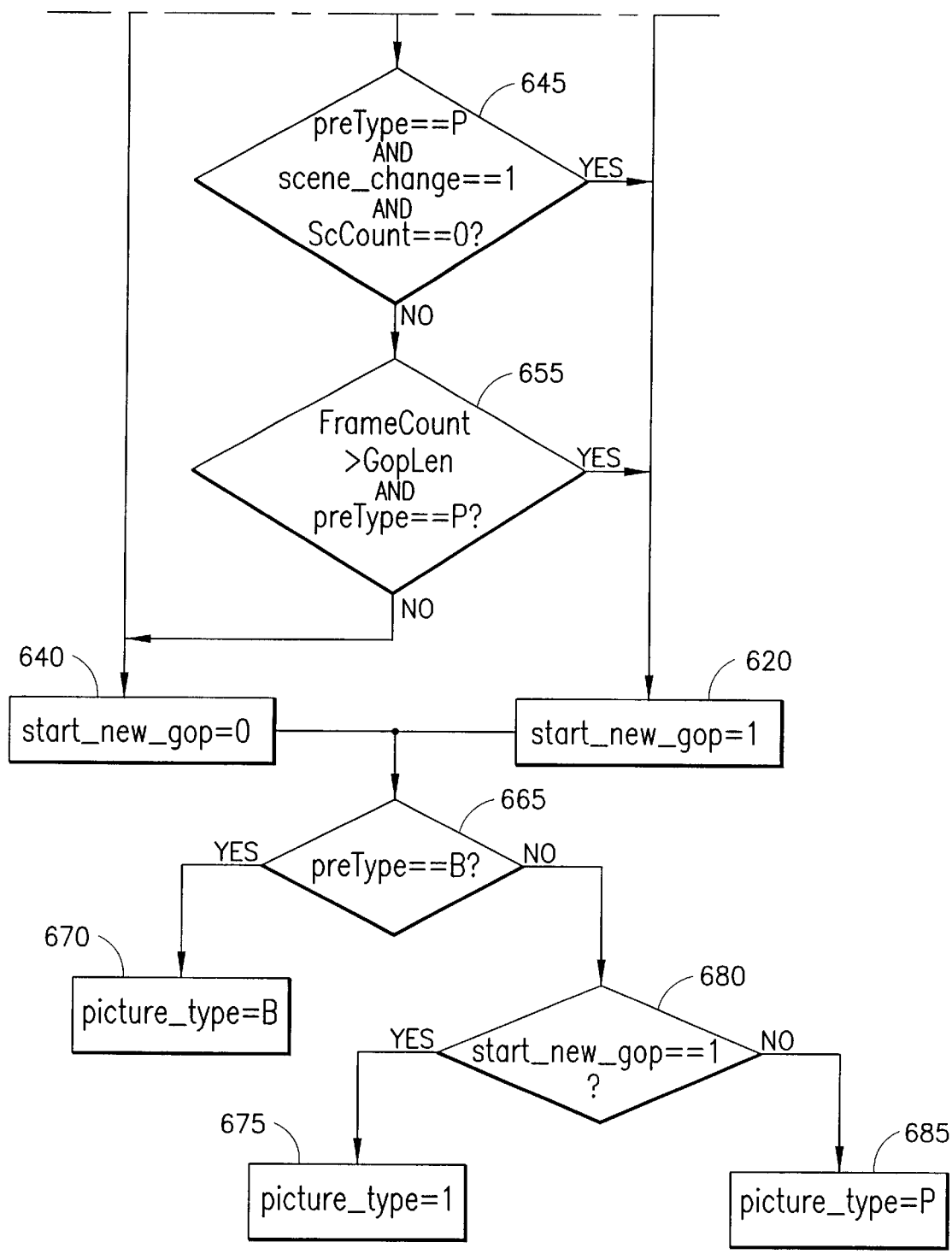

FIG. 6 illustrates a flowchart for determining the final picture coding type for a frame in accordance with the present invention.

When a frame arrives at the (final) encoding stage of the pipeline, the MCC retrieves the value of the preType and scene_change flag of the frame (block 600) from its circular buffer. This is performed for the frame to be encoded at the encoding stage 225 of the video compressor. ScCount is decreased by one (block 610) if scene_change for the current frame is set to true (block 605). These values are used to determine the final picture coding type (picture type) of the frame in block 670, 675 or 685.

A count of the number of frames that has been encoded so far in the GOP (FrameCount) is, maintained. A new GOP is started (block 620) by converting a P-frame into an I-frame (block 675) if the FrameCount reaches the user-configured nominal length of a GOP (GopLen) (block 655), or if a scene change is detected at the current frame and there is no other scene change frame currently in the processing pipeline (as indicated by ScCount=false) (block 645).

However, even if the above conditions are satisfied, a new GOP is not started (block 640) if a scene change is detected on any of the uncoded frames in the encoding pipeline (block 635), or if there is not enough space in the bitstream buffer 140 (FIG. 1) to accommodate an I-frame (block 625). An exception is when the FrameCount exceeds the maximum allowable length of a GOP (MaxGopLen) (block 615), in which case a, new GOP is started regardless (block 620).

At block 665, if the preType is a B-frame, there is no change (block 670). If the preType is a P-frame, it is changed to an I-frame (block 675) when start_new_gop is true (block 680). If the preType is a P-frame, it is not changed (block 685) when start_new_gop is false (block 680). Note that I- and P-frames are treated the same throughout the pipeline until the encoding stage. It is not necessary to determine whether a frame is an I- or P-frame until the encoding stage.

The start_new_gop flag is used (blocks 620 and 640) to signal whether or not to start a new GOP with the current frame that is to be encoded. The final value of start_new_gop and picture_type is determined as shown in the flow chart.

The buffer level threshold that is used to determine whether a new GOP can be started or not is calculated as follows:

$$ThBuf=\text{target\_buffer\_level}+(0.5*GopLen*\text{bit\_rate/frame\_rate}).$$

The target_buffer_level is set to ⅙ of the max_decoder_buffer_level for 1920×1080 I mode, and ⅕ of the max_decoder_buffer_level for 1280×720 P mode. The max_decoder_buffer_level is the maximum number of bits that a decoder buffer that receives the encoded bitstream can hold. Furthermore, the value of ThBuf is capped to not exceed half of the max_decoder_buffer_level.

Scene Change Examples

Tables A–D show four possible scene change scenarios. Other scenarios are possible. In the scenarios, the following notation is used:

X1: first field of first scene X
X2: second field of first scene X
Y1: first field of second scene Y
Y2: second field of second scene Y
xx: sumMAD between fields in scene X
xy: sumMAD between fields in scene X and scene Y (assume that xy>>xx)
O: ThNeg<delta<ThPos
+=delta>ThPos
−=delta<ThNeg For example, in Table A, each frame has first and second fields. For Frames 1 and 2, X1 is the first field, and X2 is the second field. For Frames 3–5, Y1 is the first field, and Y2 is the second field. Thus, the boundary between scene X and scene Y is at Frame 3. Frame 3 is therefore a scene change frame (ScDet=1). The scene change frame is determined by observing the delta value. For Table A, delta transitions from "O" (indicating a small or zero value) to "+" (indicating a large positive value) at the first field (Y1) of Frame 3. Delta then transitions back to "O" at the second field (Y2) of Frame 3, and then to a large negative value (−) at the first field (Y1) of Frame 4, then back to a small or zero value (O) at the second field of Frame 4.and thereafter.

Note that for the following delta sequence O, O, O, +, O, O, O, . . . ScDet would be set to "1" for the frame with the "+" delta value, and would remain at "1" for each following frames. The watchdog counter (CountDown) described above would cause ScDet to be set back to "0" after ten frames even if delta does not change to "−" to avoid remaining in a perpetual scene change state. This delta sequence could happen when an object begins moving in a still image. On the other hand, the delta sequence O, O, O, −, O, O, . . . results when a motion scene stops and becomes a still picture. In this case, no false scene change will be detected.

As an example of the notation, in Table A, the "xx" notation for Frame 2, field X1, designates the sumMAD between X1 of Frame 1 and X1 of Frame 2. The "xy" notation for Frame 3, field X1, designates the sumMAD between X1 of Frame 2 and X1 of Frame 3. The "yy" notation for Frame 4, field Y1, designates the sumMAD between X1 of Frame 3 and Y1 of Frame 4.

Case 1-A indicates resetting of the picture type based on the scene change detection for a frame sequence B, P, B, P, B. Specifically, in Frame 4, the P-frame is changed to an I-frame. This indicates the start of a new GOP.

Case 1-B indicates resetting of the picture type based on the scene change detection for a frame sequence P, B, P, B, P. Specifically, in Frame 3, the P-frame is changed to an I-frame.

Various other frames sequences are possible.

Note that ScDet is set for an entire frame, even though the detection is based on examining delta for each field.

In Table B, a scene change at the field boundary (between the first field X1 and the second field Y2) of Frame 3. X1 is part of scene X, and Y2 is part of the second scene Y.

Table C illustrates a bad edit, where X, Y and Z denote three separate scenes. A scene change is indicated for Frame 3, where Y1 is the first field of the scene Y, and X2 of Frame 2 is the last field of scene X. No scene change is detected for Frame 4 since the second field of Frame 3 (Z2) and the first field of Frame 4 (Z1) are part of the same scene (z).

Table 4 illustrates a bad edit or flash. The first field of Frame 3 (Y1) is a flash or bad edit scene.

Generally, when a scene change frame is detected, and the scene change frame is a P-frame, it is changed to an I-frame. If the scene change frame is not a P-frame, the first P-frame following the scene change frame is changed to an I-frame.

Note that these cases show an open GOP, where each I- or P-frame is separate by one or more B-frames. However, an open GOP is not required.

TABLE A

Normal Scene Change (at frame boundary):

|  | Frame 1 | | Frame 2 | | Frame 3 | | Frame 4 | | Frame 5 | |
| --- | --- | --- | --- | --- | --- | --- | --- | --- | --- | --- |
| Input fields: | X1 | X2 | X1 | X2 | Y1 | Y2 | Y1 | Y2 | Y1 | Y2 |
| SumMAD: | xx | xx | xx | xx | xy | xy | yy | yy | yy | yy |
| Delta |  | O | O | O | + | O | − | O | O | O |
| ScDet |  |  | 0 |  | 1 |  | 0 |  | 0 |  |
| case 1-A: |  |  |  |  |  |  |  |  |  |  |
| preType | B |  | P |  | B |  | P |  | B |  |
| picture_type | B |  | P |  | B |  | I |  | B |  |
| case 2-A: |  |  |  |  |  |  |  |  |  |  |
| preType | P |  | B |  | P |  | B |  | P |  |
| Picture_type | P |  | B |  | I |  | B |  | P |  |

TABLE B

Scene Change at field boundary of the same frame:

|  | Frame 1 | | Frame 2 | | Frame 3 | | Frame 4 | | Frame 5 | |
| --- | --- | --- | --- | --- | --- | --- | --- | --- | --- | --- |
| Input fields: | X1 | X2 | X1 | X2 | X1 | Y2 | Y1 | Y2 | Y1 | Y2 |
| SumMAD: | xx | xx | xx | xx | xx | xy | xy | yy | yy | yy |
| delta |  | O | O | O | O | + | O | − | O | O |
| ScDet |  |  | 0 |  | 1 |  | 0 |  | 0 |  |
| case 1-B: |  |  |  |  |  |  |  |  |  |  |
| preType | B |  | P |  | B |  | P |  | B |  |
| picture_type | B |  | P |  | B |  | I |  | B |  |
| case 2-B: |  |  |  |  |  |  |  |  |  |  |
| preType | P |  | B |  | P |  | B |  | P |  |
| picture_type | P |  | B |  | I |  | B |  | P |  |

TABLE C

Bad edits:

|  | Frame 1 | | Frame 2 | | Frame 3 | | Frame 4 | | Frame 5 | | Frame 6 | |
|---|---|---|---|---|---|---|---|---|---|---|---|---|
| Input fields: | X1 | X2 | X1 | X2 | Y1 | Z2 | Z1 | Z2 | Z1 | Z2 | Z1 | Z2 |
| SumMAD: | xx | xx | xx | xx | xy | xz | yz | zz | zz | zz | zz | zz |
| delta |  | o | o | o | + | + | + | – | o | o | o | o |
| ScDet |  |  | 0 |  | 1 |  | 0 |  | 0 |  | 0 |  |
| case 1-C: |  |  |  |  |  |  |  |  |  |  |  |  |
| preType | B |  | P |  | B |  | P |  | B |  | P |  |
| picture_type | B |  | P |  | B |  | I |  | B |  | P |  |
| case 2-C: |  |  |  |  |  |  |  |  |  |  |  |  |
| preType | P |  | B |  | P |  | B |  | P |  | P |  |
| picture_type | P |  | B |  | I |  | B |  | P |  | B |  |

TABLE D

Bad edits or flashes:

|  | Frame 1 | | Frame 2 | | Frame 3 | | Frame 4 | | Frame 5 | | Frame 6 | |
|---|---|---|---|---|---|---|---|---|---|---|---|---|
| Input fields: | X1 | X2 | X1 | X2 | Y1 | X2 | X1 | X2 | X1 | X2 | X1 | X2 |
| SumMAD: | xx | xx | xx | xx | xy | xx | xy | xx | xx | xx | xx | xx |
| delta |  | o | o | o | + | – | + | – | o | o | o | o |
| ScDet |  |  | 0 |  | 1 |  | 0 |  | 0 |  | 0 |  |
| case 1-D: |  |  |  |  |  |  |  |  |  |  |  |  |
| preType | B |  | P |  | B |  | P |  | B |  | P |  |
| picture_type | B |  | P |  | B |  | I |  | B |  | P |  |
| case 2-D: |  |  |  |  |  |  |  |  |  |  |  |  |
| Pre Type | P |  | B |  | P |  | B |  | P |  | B |  |
| picture_type | P |  | B |  | I |  | B |  | P |  | B |  |

Frame_Pred_Frame_DCT decision:

MPEG-2 encoders use only frame-based prediction and DCT for film mode pictures. This is achieved by setting the flag frame pred_frame_dct=1 in the bit stream syntax. If frame pred_frame_dct=0, either field- or frame-based prediction and DCT can be used on a macroblock-by-macroblock basis for the picture.

Furthermore, MPEG-2 provides a repeat_first_field flag to signal, when set to one, that the current frame belongs to a film and contains a redundant first field such that the frame is composed by three input fields. Specifically, the first field (top or bottom field as identified by the MPEG value top_field_first) is followed by the other field, then the first field is repeated.

The present inventors have determined that, if a film frame contains a redundant first field (repeat_first_field=1), it is not likely that a scene change has occurred at a boundary between the odd and even fields of this frame. It is more likely that there was a clean scene change at a frame boundary. Therefore, frame_pred_frame_dct=1 is set according to the conventional MPEG-2 scheme, and the entire frame is encoded using frame-based DCT and prediction.

However, to handle the special case when a scene change has occurred at the odd-even field boundary of a film mode frame, the frame_pred_frame_dct flag is overridden in accordance with the present invention to allow either frame- or field-based prediction and DCT on a macroblock-by-macroblock basis. This improves coding efficiency, even with the increased overhead of the bits required to designate whether field- or frame-based prediction and DCT is being used for each macroblock, since the correlation of pre-scene change fields will be high, and the correlation of post-scene change fields will be high, but the correlation of a frame; comprising both pre- and post-scene change fields with other frames comprising only pre- or post-scene change fields will be low.

Thus, when there is a bad edit in film mode frame, the encoder is not restricted to use only frame-based prediction and DCT on the transition frame.

Accordingly, if a scene change is detected on a particular frame, the value of the frame pred_frame_dct flag is set to the same value as the repeat_first_field flag. Otherwise, the frame_pred_frame_dct flag is solely determined by the result of telecine detection such that frame_pred_frame_dct is set to true if film is detected, and set to zero if film is not detected.

It should now be appreciated that the present invention provide a system for detecting scene changes on a field-by-field basis, and adjusting the picture coding type to, optimize the coding efficiency of a video encoder. By aligning I-frames with scene changes, the coding efficiency of an MPEG encoder is significantly improved. The invention is advantageous for both HDTV and SDTV signals. Upon detecting a scene change, including flashes, or bad fields that result from improper editing, the picture coding type is adjusted to optimize the coding efficiency of the video encoder. The starting pictures of a new GOP (i.e., an I-frame) is aligned with a scene change to significantly improve the coding efficiency of an MPEG encoder. In a preprocessing stage, the change in the sum of pixel differences between consecutive odd fields, or consecutive even fields, is calculated for every consecutive input field. A scene change is detected when a large positive value in the change of sum is followed by a large negative value therein. A decision of which picture type to use is not made until a final encoding stage. I-frames can be inhibited when an encoder buffer level is too high.

A watchdog counter resets the scene change indication to avoid a perpetual scene change state for transitions from still to motion.

For an MPEG film mode frame that is determined to be a scene change frame, the MPEG-recommended frame-based Discrete Cosine Transform (DCT) and prediction encoding is deactivated when a scene change may have occurred on a field boundary (e.g., when there is no redundant field in the picture). Upon such deactivation, either frame- or field-based DCT and prediction can be use on a macroblock-by-marcoblock basis in the picture.

Although the invention has been described in connection with various specific embodiments, those skilled in the art will appreciate that numerous adaptations and modifications may be made thereto without departing from the spirit and scope of the invention as set forth in the claims.

For example, while various syntax elements have been discussed herein, note that they are examples only, and any syntax may be used.

What is claimed is:

1. A method for encoding a digital video signal having successive video frames, comprising the steps of:
    preprocessing the video signal to calculate, for each successive frame, a first sum of pixel differences between a first field thereof and a first field of a previous frame, and a second sum of pixel differences between a second field thereof and a second field of the previous frame;
    calculating, for each successive frame, a change in the first and second sums thereof relative to the first and second sums, respectively, of the previous frame; and
    designating a particular one of the successive frames as a scene change frame when the change in at least one of the first or second sums thereof exceeds a positive threshold, and a change in at least one of the first or second sums of a subsequent frame is less than a negative threshold;
    wherein the video signal is processed using a pipeline architecture that provides a lookahead buffer capability for encoding the successive video frames.

2. The method of claim 1, comprising the further step of:
    inhibiting the encoding of intra-coded (I) frames when the scene change frame has been designated.

3. The method of claim 1, comprising the further steps of:
    maintaining a count of a number of consecutive scene change frames; and
    terminating the scene change designation of the scene change frame for which the count exceeds a maximum value to avoid remaining in a perpetual scene change state for a still-to-motion video transition.

4. The method of claim 1, comprising the further step of:
    maintaining a count of a number of uncoded scene change frames currently in a processing pipeline of a video encoder.

5. The method of claim 4, comprising the further step of:
    inhibiting the encoding of intra-coded (I) frames for as long as the count has a value greater than zero, except for the last scene change frame in a burst of scene change frames.

6. The method of claim 1, wherein said pipeline architecture includes: (a) a preprocessing stage, wherein said preprocessing, calculating and designating steps occur, and (b) an encoding stage, wherein each frame is encoded, said method comprising the further step of:
    changing a pre-assigned picture type of one of the frames at the encoding stage in response to said designating step.

7. The method of claim 6, wherein:
    the pre-assigned picture type for the scene change frame, which is a P-frame, is changed to an I-frame in said changing step.

8. The method of claim 6, wherein:
    the scene change frame is a B-frame, and the pre-assigned picture type for the next successive P-frame is changed to an I-frame in said changing step.

9. The method of claim 1, comprising the further step of:
    commencing the encoding of a new group of pictures (GOP) according to when the scene change frame has been designated.

10. The method of claim 1, wherein the scene change frame is a film mode frame, comprising the further steps of:
    determining whether a scene change boundary between first and second fields of the film mode frame is indicated; and
    allowing both frame- and field-based prediction and Discrete Cosine Transform (IDCT) encoding of the film mode frame on a macroblock-by-macroblock basis when said boundary is indicated in said determining step.

11. The method of claim 10, wherein:
    said determining step determines that a scene change boundary between the first and second fields of the film mode frame is indicated when there are no repeated fields in the film mode frame.

12. The method of claim 10, comprising the further step of:
    allowing only frame-based prediction and Discrete Cosine Transform (DCT) encoding of the film mode frame when said determining step determines that a scene change ,boundary between the first and second fields of the film mode frame is not indicated.

13. The method of claim 12, wherein:
    said determining step determines that a scene change boundary between the first and second fields of the film mode frame is not indicated when there is a repeated field in the film mode frame.

14. The method of claim 1, comprising the further steps of:
    monitoring a fullness level of a buffer that receives encoded data of the video signal; and
    inhibiting the encoding of intra-coded (I) frames according to when the fullness level exceeds a maximum value.

15. The method of claim 1, comprising the further step of:
    inhibiting the encoding of intra-coded (I) frames when the scene change frame has been designated until the scene change frame is encoded and there are no other scene change frames designated but not yet encoded.

16. A method for encoding a digital video signal having successive video frames, comprising the steps of:
    designating a particular one of the successive frames as a scene change frame according to scene change criteria;
    wherein the scene change frame is a film mode frame;
    determining whether a scene change boundary between first and second fields of the film mode frame is indicated; and allowing both frame- and field-based prediction and Discrete Cosine Transform (DCT) encoding of the film mode frame on a macroblock-by-macroblock basis when said boundary is indicated in said determining step.

17. The method of claim 16, wherein:

said determining step determines that a scene change boundary between the first and second fields of the film mode frame is indicated when there are no repeated fields in the film mode frame.

18. The method of claim 16, comprising the further step of:

allowing only frame-based prediction and Discrete Cosine Transform (DCT) encoding of the film mode frame when said determining step determines that a scene change boundary between the first and second fields of the film mode frame is not indicated.

19. The method of claim 18, wherein:

said determining step determines that a scene change boundary between the first and second fields of the film mode frame is not indicated when there is a repeated field in the film mode frame.

20. An apparatus for encoding a digital video signal having successive video frames, comprising:

a preprocessor for preprocessing the video signal to calculate, for each successive frame, a first sum of pixel differences between a first field thereof and a first field of a previous frame, and a second sum of pixel differences between a second field thereof and a second field of the previous frame;

means for calculating, for each successive frame, a change in the first and second sums thereof relative to the first and second sums, respectively, of the previous frame; and a scene change detector for designating a particular one of the successive frames as a scene change frame when the change in at least one of the first or second sums thereof exceeds a positive threshold, and a change in at least one of the first or second sums of a subsequent frame is less than a negative threshold.

21. An apparatus for encoding a digital video signal having successive video frames, comprising:

means for designating a particular one of the successive frames as a scene change frame according to scene change criteria;

wherein the scene change frame is a film mode frame;

a scene change detector for determining whether a scene change boundary between first and second fields of the film mode frame is indicated; and means for allowing both frame- and field-based prediction and Discrete Cosine Transform (DCT) encoding of the film mode frame on a macroblock-by-marcoblock basis when said scene change detector determines said boundary is indicated.

* * * * *

UNITED STATES PATENT AND TRADEMARK OFFICE
CERTIFICATE OF CORRECTION

PATENT NO. : 6,731,684 B1  Page 1 of 1
DATED : May 4, 2004
INVENTOR(S) : Wu

It is certified that error appears in the above-identified patent and that said Letters Patent is hereby corrected as shown below:

Column 14,
Line 26, correct "(IDCT)" to read -- (DCT) --
Line 40, delete the comma between the words "change, boundary" so that it reads -- change boundary --

Signed and Sealed this

Thirteenth Day of July, 2004

JON W. DUDAS
*Acting Director of the United States Patent and Trademark Office*